(12) United States Patent
Bosma

(10) Patent No.: US 8,860,981 B2
(45) Date of Patent: Oct. 14, 2014

(54) SYSTEMS AND METHODS FOR PRINT JOB SCHEDULING

(75) Inventor: Paul Bosma, Boulder, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 844 days.

(21) Appl. No.: 12/749,098

(22) Filed: Mar. 29, 2010

(65) Prior Publication Data
US 2011/0235092 A1    Sep. 29, 2011

(51) Int. Cl.
*G06F 3/12* (2006.01)
*G06K 15/00* (2006.01)

(52) U.S. Cl.
CPC .............. *G06F 3/126* (2013.01); *G06F 3/1285* (2013.01); *G06F 3/1211* (2013.01)
USPC ......................................... 358/1.15; 358/1.16

(58) Field of Classification Search
None
See application file for complete search history.

(56) References Cited

U.S. PATENT DOCUMENTS

| | | | |
|---|---|---|---|
| 7,362,457 B1 * | 4/2008 | Shima | 358/1.15 |
| 2002/0054322 A1 * | 5/2002 | Geelen et al. | 358/1.15 |
| 2002/0109861 A1 * | 8/2002 | LeClair et al. | 358/1.15 |
| 2004/0176118 A1 * | 9/2004 | Strittmatter et al. | 455/500 |
| 2007/0133485 A1 * | 6/2007 | Tredoux et al. | 370/338 |
| 2007/0136226 A1 * | 6/2007 | Irick | 707/1 |
| 2010/0083273 A1 * | 4/2010 | Sihn et al. | 718/104 |

* cited by examiner

*Primary Examiner* — Fan Zhang
(74) *Attorney, Agent, or Firm* — Osha Liang LLP

(57) ABSTRACT

Methods disclosed facilitate the scheduling of print jobs. In some embodiments, the retrieval of remote files that are targets of print requests can be deferred. Print requests may be specified using JDF and/or JMF. A print queue holds entries corresponding to the remote target files and each queue entry is also associated with location information for its corresponding remote target file. When the queue entry is processed the location information associated with the queue entry is used to retrieve the remote target file for printing.

18 Claims, 4 Drawing Sheets

200

```
<?xml version="1.0" encoding="UTF-8"?>

<JMF xmlns="http://www.CIP4.org/JDFSchema_1_1"
xmlns:xsi="http://www.w3.org/2001/XMLSchema-instance"

SenderID="JDFTester"
TimeStamp="YYYY-MM-DDTHH:MM:SS-XX:YY"
Version="1.3">
```
210

```
<Command ID="JMFTEST_201"

Type="SubmitQueueEntry"
  xsi:type="CommandSubmitQueueEntry">

<QueueSubmissionParams ReturnJMF="http://caribou:9180"
    URL="file://tests/us/pdf/melange/balloons.pdf"
    Priority = "75" />

</Command>
```
230

240

```
</JMF>
```

FIG. 2

SYSTEMS AND METHODS FOR PRINT JOB SCHEDULING

BACKGROUND

1. Field of the Invention

The present invention relates to the field of printing and in particular, to systems and methods for scheduling print jobs.

2. Description of Related Art

Computer printers, which are ubiquitous in most modern organizations, permit the quick printing of stored documents. When a user requests the printing of a document, the documents may be converted to a printable form and a print request pertaining to the document may be sent to the appropriate printer or print controller. In many instances, the print request may take the form of a Job Definition Format ("JDF") ticket. JDF is an exchange format for instructions and job parameters. JDF can be used to relay job descriptions, parameters and instructions, and can also be used to describe a job in terms of individual production processes and the materials or other process inputs needed to complete a job. JDF permits communications using both files in JDF, and/or using network messages in the Job Messaging Format ("JMF"), which is eXtensible Markup Language ("XML") based. A JDF file or JMF message can include information that permits a printer to determine the input files, their location, and the actions to be performed.

When a printer receives a JDF file or a JMF message, the printer may use the information in the file or message to retrieve the remote document to be printed immediately, store the retrieved document locally, and add the document to its print queue—a process termed spooling. However, spooling has several disadvantages. For example, a low cost printer may have a limited ability to store jobs. Even higher-end printers with more storage may encounter periods where the spooling of additional jobs may be difficult. In other instances, the parameters for a print job may change between the time of submission and the time of printing so that originally submitted (and retrieved) job can no longer be used. Accordingly, there is a need for systems and methods that facilitate the scheduling of printing jobs in situations where spooling may be impractical or unavailable.

SUMMARY

Consistent with embodiments disclosed herein, systems and methods for print job scheduling are presented. In some embodiments, a method for processing print job requests comprising includes the steps of: receiving a print job request, wherein the job request includes location information identifying at least one remote file that is a target of the print request; parsing the print job request to extract the location information for the at least one remote file; adding at least one queue entry to a print job queue, wherein the at least one queue entry corresponds to the print job request and the at least one queue entry is associated with the location information for the at least one remote file; and deferring retrieval of the remote file until the at least one queue entry reaches a predetermined position in the print queue.

Embodiments also relate to software, firmware, and program instructions created, stored, accessed, or modified by processors using computer-readable media or computer-readable memory. These and other embodiments are further explained below with respect to the following figures.

BRIEF DESCRIPTION OF THE DRAWINGS

FIG. 2 shows an exemplary JDF file.

DETAILED DESCRIPTION

In accordance with embodiments disclosed herein, systems and methods for print job scheduling are presented.

Figure 1:
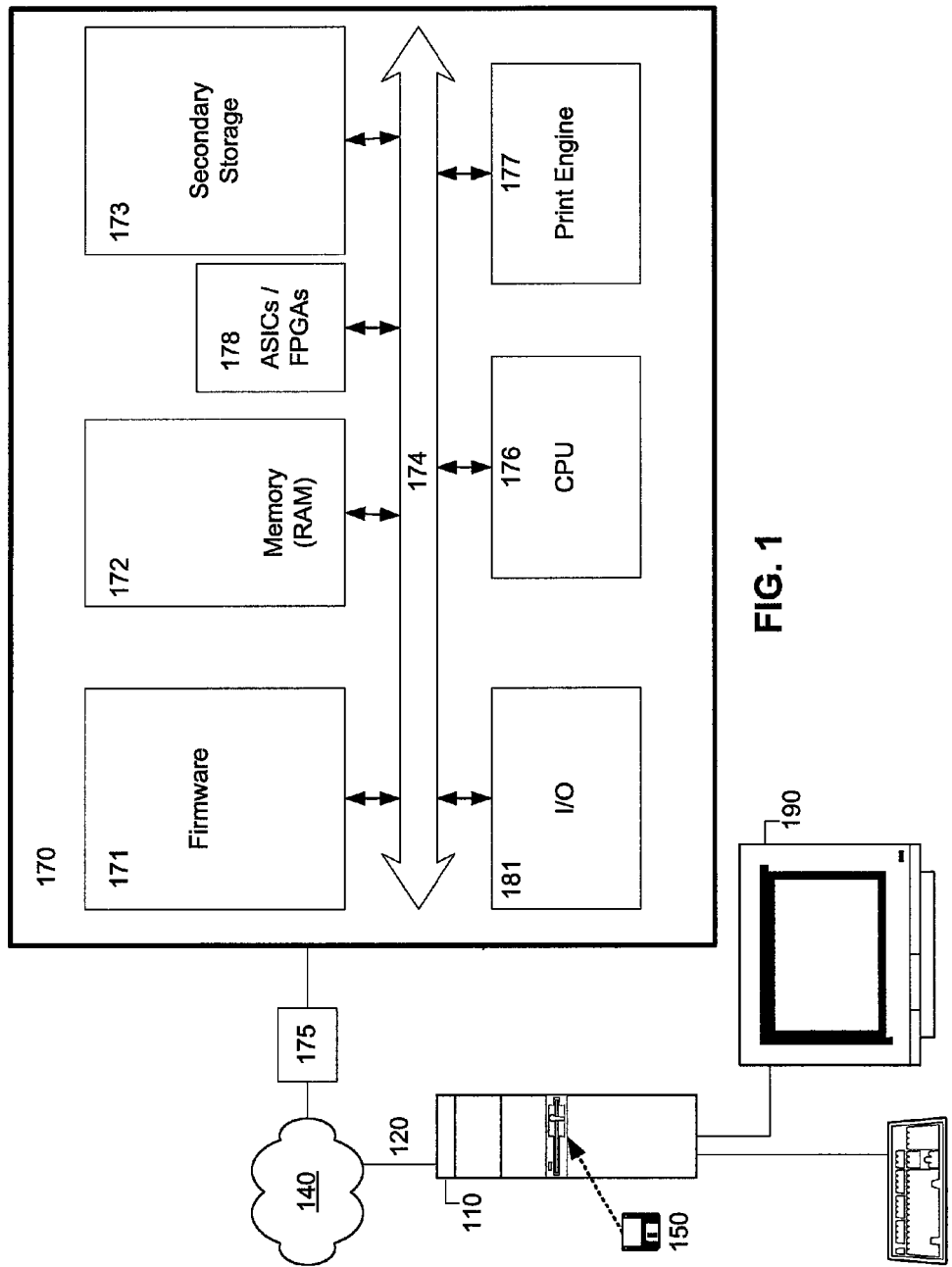
FIG. 1 shows a high-level block diagram of an exemplary system for print scheduling.

FIG. 1 shows a high-level block diagram of an exemplary system for print scheduling. In general, a computer software application for print scheduling may be deployed on a network of computers 110, printers 170, and/or print controllers 175 that are connected through communication links that allow information to be exchanged using conventional communication protocols and/or data port interfaces.

As shown in FIG. 1, exemplary system 100 includes computer or computing device 110, printer 170, and print controller 175. Network 140 may include subnets, Local Area Networks ("LANs), and/or Wide Area Networks ("WAN"s). Further, network 140 may also include modems, routers, repeaters, and other communication devices (not shown) that permit devices that are coupled to a network 140 to communicate with other devices over wired or wireless connections in accordance with the policies set by a network administrator.

In general, computing device 110 may be a computer workstation or desktop computer, laptop or portable computer, handheld device, or any other mobile computing device capable of being used in a networked environment. Computing device 110, printer 170, and/or printer controller 175 may be capable of executing software (not shown) that facilitates print job scheduling in a manner consistent with disclosed embodiments.

Computing device 110, printer 170, and print controller 175 may contain removable media drives 150. Removable media drives 150 may include, for example, 3.5 inch floppy drives, CD-ROM drives, DVD ROM drives, CD±RW or DVD±RW drives, USB flash drives, Memory Sticks™, Secure Digital High Capacity ("SDHC") cards, and/or any other removable media drives consistent with embodiments of the present invention. Portions of software applications may reside on removable media and be read and executed by computing device 110, using removable media drive 150. In some embodiments, intermediate and final results and/or reports generated by applications may also be stored on removable media.

Printers 170 (such as printers 170-1 through 170-5) may be laser printers, ink jet printers, LED printers, plotters, and of various other types. From a functional perspective, printers 170 may take the form of computer printers, facsimile machines, digital copiers, multi-function devices, and/or various other devices that are capable of printing documents.

Connection 120 couples computing device 110, print controller 175 and printer 170 to network 140. Connection 120 may be implemented as a wired or wireless connection using appropriate conventional communication protocols and/or data port interfaces. In general, connection 120 can be any communication channel that allows transmission of data between the devices. In one embodiment, for example, devices may be provided with data ports, such as USB™, SCSI, FIREWIRE™, and/or BNC ports for transmission of data through the appropriate connection 120. The communication links could be wireless links or wired links or any combination that allows communication between computing devices 110, print controller 175, and printer 170.

Printer 170 may be controlled by hardware, firmware, or software, or some combination thereof. Printer 170 may include one or more print controller boards 175, such as exemplary print controller 175. Print controller 175, which may be internal or external to printer 170, may control the operation of printer 170, and may also be capable of receiving and acting on job requests as well as capability and status requests for printer 170 and sending responses to the requesting device. In some embodiments, printer 170 may be controlled by firmware or software resident on memory devices in print controller 175. Exemplary print controller 175 may also be controlled in part by software, including print servers, printer drivers, or other software, running on computing devices 110, and/or server 130.

A computer software application for print job scheduling may be deployed on one or more of exemplary computer 110, print controller 175, and/or printer 170, as shown in FIG. 1. For example, printer 170 may execute software or firmware that permits printer 170 to perform print job scheduling in a manner consistent with disclosed embodiments. In another example, an application for print job scheduling may be resident on computer 110 and/or print controller 175, and operate on printer 170. In general, applications may execute in whole or in part on one or more computer 110, print controller 175, and/or printers 170 in the system. The embodiments described herein are exemplary only and other embodiments and implementations will be apparent to one of ordinary skill in the art.

Exemplary printer 170 may contain bus 174 that couples CPU 176, firmware 171, memory 172, input-output ("I/O") module 181, print engine 177, and secondary storage device 173. Exemplary printer 170 may also contain other Application Specific Integrated Circuits (ASICs), and/or Field Programmable Gate Arrays (FPGAs) 178 that are capable of executing portions of an application for print job scheduling. In some embodiments, exemplary printer 170 may also be capable of executing software including, a printer operating system, job scheduling routines, JDF and JMF processing routines, parsing and conversion routines, database management software, software to process print job requests, printer status requests, printer configuration software, as well as other appropriate application software.

Exemplary I/O module 181 may also permit communication with computer 110 over network 140. Information received from computer 110 and/or print controllers 175 may be processed by I/O module 181 and stored in memory 172. I/O module 181 may also notify CPU 176 about the communications. The communications may include data, commands, print job requests including JDF and JMF requests, capability requests, status requests, responses, and/or acknowledgements according to the protocol being used. CPU 176 may retrieve any information stored in memory 172 and process the information further.

Exemplary CPU 176 may be a general-purpose processor, a special purpose processor, or an embedded processor. CPU 176 can exchange data including control information and instructions with memory 172 and/or firmware 171. Memory 172 may be any type of Dynamic Random Access Memory ("DRAM") such as but not limited to SDRAM, or RDRAM. Firmware 171 may hold instructions and data including but not limited to a boot-up sequence, pre-defined routines including routines for job scheduling, processing JDF and JMF requests, processing incoming requests and messages, composing outgoing responses and messages, routines for configuration management, routines for document processing, and other code. In some embodiments, code and data in firmware 171 may be copied to memory 172 prior to being acted upon by CPU 176. Data and instructions in firmware 171 may be upgradeable using one or more of computer 110, network 140, removable media coupled to printer 170, and/or secondary storage 173.

Exemplary CPU 176 may act upon instructions and data and provide control and data to ASICs/FPGAs 178 and print engine 177 to generate printed documents. ASICs/FPGAs 178 may also provide control and data to print engine 177. FPGAs/ASICs 178 may also implement one of configuration management, message processing, and other print related algorithms. Intermediate and final printable data, messages, printer status, and configuration information pertaining to one or more printers 170 may be stored in memory 172 or secondary storage 173.

Note that various methods and protocols may be used to send and communicate with printer 170 regarding print jobs. For example, Printer Job Language ("PJL") may be used to obtain job state-related information. Other protocols that may be used include (without limitation) various XML-based protocols. One such example is JDF, which is an industry standard designed to simplify information exchange. JDF includes JMF, which is the language used to communicate between JDF agents and controllers. JMF allows a controller to communicate with JDF management information system or a workflow information system to obtain printer state related information. Note that various printer manufacturers may also use proprietary systems or de facto standards to enable server 130 or other devices to obtain printer or job state related information. For example, Microsoft™ offers Web Services on Devices ("WSD") protocol, which can also be used to access printer state related information by server 130. In general, server 130 may use one or more of various available mechanisms to send jobs to printer and obtain printer state related information depending on the protocol supported by the individual printers 170. The exemplary methods described herein may be easily extended by one of ordinary skill in the art to other standards and protocols.

FIG. 2 shows exemplary JDF file 200. As shown in FIG. 2, exemplary JDF file 200 can be viewed as including header section 210 and command section 230. Note that the sections identified above are exemplary and for explanatory purposes only. Header section 210 can identify the XML version, the JDF schema version and instance as well as sender information identifying the sender of the JDF request, and a timestamp with date (YYYYMMDD), time (HHSS) and Coordinated Universal Time ("UTC") offset (±XX:YY) information. Information in header section 210 may be used by routines in printer 170 and/or print controller 175 to obtain information for parsing JDF file 200. Information in header section 210 may also include sender identification, which may be a network name for the sender of the JDF request. For example, the header section identifies the sender of JDF file 200 as "JDFTester".

Command section 230 may include a command identifier and other information such as location information of the file to be printed. For example, a Uniform Resource Locator ("URL") may specify the location of the file being printed. The URL may specify where the identified file is available as well as a mechanism for retrieving the file. As shown in FIG. 2, the location of the file "balloons.pdf" is specified by the URL file://tests/us/pdf/melange/balloons.pdf.

Figure 3:
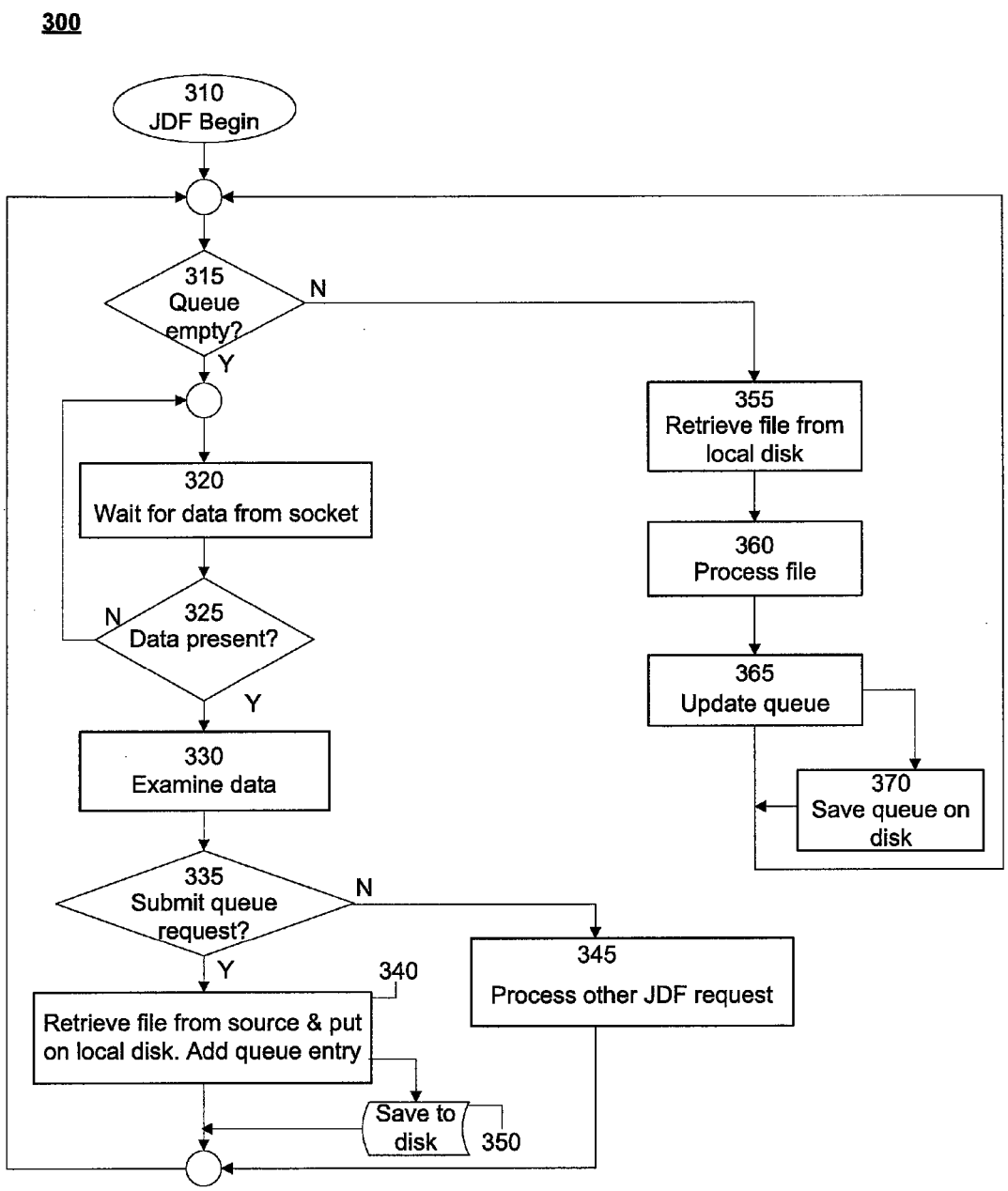
FIG. 3 shows a flowchart illustrating a conventional method for processing JDF print jobs.

FIG. 3 shows a flowchart illustrating a conventional method 300 for processing JDF print jobs. The method commences in step 310. In step 315, the printer queue may be inspected. If the print queue is empty ("Y" in step 315), then, in step 320, the spooler may wait for incoming data, which may be delivered using a network socket. If there is incoming data in step 325, then, in step 330, the data may be parsed. For example, JDF file 200 or a JMF message may be parsed in step 330.

If the JMF message or JDF file 200 includes location information (such as a URL) for file that is the target of the print request then a queue request may submitted to the print spooler ("Y") in step 335. Otherwise, ("N" in step 335) JDF file 200 or the JMF message may be processed appropriately in step 345 and the algorithm returns to step 315 to begin another iteration. In step 340, the queue request (submitted in step 335) may be processed and the target remote file specified by the URL can be retrieved. The retrieved file that is the target of the print request is saved to disk in step 350 and the algorithm returns to step 315 to begin another iteration.

In step 315, if the queue is not empty ("N" in step 315) then, in step 355, the target file to be printed (which was previously retrieved and stored locally) is retrieved from a locally accessible disk on printer 170, print controller 175 or computer 110. The target file may be processed and printed in step 360 and the print queue may be updated in step 365. For example, if the target file has been printed successfully then the entry corresponding to the file may be removed from the print queue and the file may be deleted from the local disk. On the other hand, if the file cannot be printed then appropriate corrective action may be taken. The updated queue may be saved to disk in step 370 and the algorithm may return to step 315 to begin another iteration.

The conventional method outlined above in step 300 suffers from several shortcomings. For example, a low cost printer may have a limited storage capacity and therefore a limited ability to store jobs, which, in turn, may limit the size of the print queue. Even higher-end printers with more storage may encounter periods where the spooling of new print jobs may be difficult or impractical. For example, if a large number of jobs are submitted in a short time, or the mix of jobs submitted includes several large files, printer 170 may not have the capacity to retrieve and store the associated files. In other instances, the parameters for a print job may change between the time of submission and the time of printing so that the originally submitted (and retrieved) job can no longer be used. Accordingly, in conventional schemes, one or more print jobs may have to be re-submitted or retrieved again.

Figure 4:
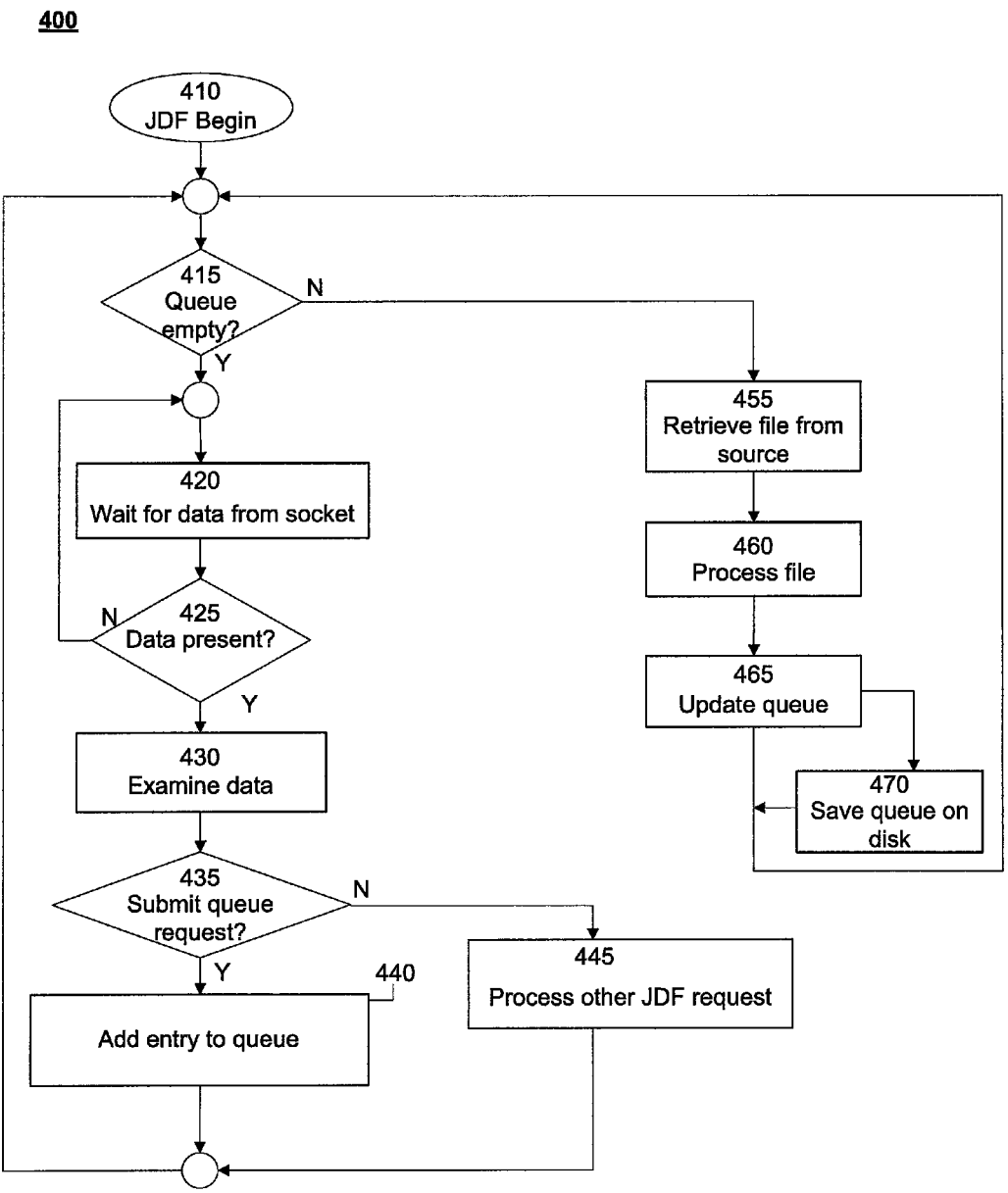
FIG. 4 shows a flowchart illustrating an exemplary method for processing JDF print jobs in a manner consistent with disclosed embodiments.

FIG. 4 shows a flowchart illustrating an exemplary method 400 for processing JDF print jobs in a manner consistent with disclosed embodiments. In some embodiments, exemplary method 400 may be implemented on printer 170, print controller 175, and/or computer 110. In some embodiments, the method may commence in step 410. In step 415, the job queue for printer 170 may be inspected. If the job queue for printer 170 is empty ("Y" in step 415), then, in step 420, the spooler may wait for incoming data (file or message), which may be delivered using a network socket. If there is incoming data in step 425, then, in step 430, the data received may be parsed. For example, JDF file 200 or a JMF message may be parsed in step 430 to extract information from the file or message.

If the JMF message or JDF file 200 includes location information, (such as the URL) for a remote file that is the target of the print request, then a queue request may submitted to the print spooler ("Y") in step 435. Otherwise, ("N" in step 435) JDF file 200 or the JMF message may be processed appropriately in step 445 and the algorithm returns to step 415 to begin another iteration.

In one embodiment, the queue request (submitted in step 435) may be processed in step 440 and the URL for the remote file that is the target of the print request may be associated with the queue entry and the algorithm may return to step 415 to begin another iteration. In step 415, if the job queue for printer 170 is not empty ("N" in step 415) then, in step 455, the next entry in the queue for printer 170 may be processed by retrieving the remote target file using location information associated with the queue entry. In one embodiment, a URL associated with the queue entry may be used to retrieve the remote target file from the location pointed to by the URL. The retrieved target file may then be processed and printed in step 460 and the print queue may be updated in step 465. For example, if the target file has been retrieved and printed successfully then the entry corresponding to the file may be removed from the print queue. On the other hand, if the file cannot be printed then appropriate corrective action may be taken. For example, if the file cannot be retrieved because the source location is temporarily inaccessible, then the entry may be dropped down in the queue and processed at a later time. The updated queue may be saved to disk in step 370 and the algorithm may return to step 315 to begin another iteration.

In some embodiments, method 400 may be used in conjunction with method 300. For example, when no more files can be retrieved by printer 170 because of a lack of disk storage, or because disk storage is below a specified threshold then method 400 may be invoked allowing URL's to be added as queue entries and deferring file retrievals. In some embodiments, various parameters such as available network bandwidth, available storage space for print jobs, the estimated time that the print job can be processed, and/or various other parameters can be used to determine whether the file associated with a print job is retrieved and stored locally or whether the retrieval is deferred. For example, if the available network bandwidth at the time JDF file 200 is parsed is low then the job may be added to the queue and the URL of the file to be printed may be associated with the queue entry. In some embodiments, a flag may be used to indicate whether the job has already been retrieved, or whether the retrieval will occur at the time the queue entry is processed.

In some embodiments, a file specified by the URL associated with a print job may be retrieved based on the position of its queue entry relative to the head of the queue. For example, the files associated with the first five queue entries may be retrieved and stored locally when the print job request is received, while the retrieval of the file associated with the sixth queue entry may be deferred.

In some embodiments, a program for conducting the process described in algorithms 400 can be recorded on computer-readable media 150 or computer-readable memory. These include, but are not limited to, Read Only Memory (ROM), Programmable Read Only Memory (PROM), Flash Memory, Non-Volatile Random Access Memory (NVRAM), or digital memory cards such as secure digital (SD) memory cards, Compact Flash™, Smart Media™, Memory Stick™, and the like. In some embodiments, one or more types of computer-readable media may be coupled to printer 170. In certain embodiments, portions of a program to implement the systems, methods, and structures disclosed may be delivered over network 140.

Other embodiments of the present invention will be apparent to those skilled in the art from consideration of the specification and practice of one or more embodiments of the invention disclosed herein. It is intended that the specification and examples be considered as exemplary only, with a true scope and spirit of the invention being indicated by the following claims.

What is claimed is:

1. A processor implemented method for processing print job requests comprising:
receiving, by a printer, a print job request, wherein the print job request includes location information identifying at least one remote file that is a target of the print job request;
parsing, by the printer, the print job request to extract the location information for the at least one remote file;
adding, by the printer, at least one queue entry to a print job queue in the printer comprising a head position, wherein the at least one queue entry corresponds to the print job request, and wherein the printer prints a print job in the head position;
if no criterion for deferral is met,
retrieving, by the printer, the at least one remote file using the location information associated with the remote file,
storing, by the printer, the at least one remote file in a local memory in the printer,
associating, by the printer the at least one queue entry with the at least one remote file stored in the local memory; and
if at least one criteria for deferral is met,
associating, by the printer, the at least one queue entry with the location information for the at least one remote file,
deferring, by the printer, attempted retrieval of the remote file until the at least one queue entry is within a predetermined number of positions in the print job queue after the head position, and
moving, by the printer, the at least one queue entry to another location in the print job queue if the remote file cannot be retrieved.

2. The method of claim 1, wherein the print job request is a JDF or JMF request.

3. The method of claim 1, wherein the location information for the at least one remote file is specified using a URL.

4. The method of claim 1, wherein the at least one criteria for deferral includes whether a local storage available to process the at least one remote file is below a specified threshold when the print job is received.

5. The method of claim 1, wherein the at least one deferral criteria includes whether an available network bandwidth is below a specified threshold when the print job is received.

6. The method of claim 1, wherein the at least one deferral criteria includes whether an estimated time before the at least one remote file can be printed exceeds a specified threshold when the print job is received.

7. A non-transitory computer-readable medium including program instructions, which when executed by a printer, perform steps in a method for processing print job requests comprising:
receiving, by the printer, a print job request, wherein the print job request includes location information identifying at least one remote file that is a target of the print job request;
parsing, by the printer, the print job request to extract the location information for the at least one remote file;
adding, by the printer, at least one queue entry to a print job queue in the printer comprising a head position, wherein the at least one queue entry corresponds to the print job request, and wherein the printer prints a print job at the head position;
if no criterion for deferral is met,
retrieving, by the printer, the at least one remote file using the location information associated with the remote file,
storing, by the printer, the at least one remote file in a local memory,
associating, by the printer, the at least one queue entry with the at least one remote file stored in the local memory; and
if at least one criteria for deferral is met,
associating, by the printer, the at least one queue entry with the location information for the at least one remote file,
deferring, by the printer, attempted retrieval of the remote file until the at least one queue entry is within a predetermined number of positions in the print job queue after the head position, and
moving, by the printer, the at least one queue entry to another location in the print job queue if the remote file cannot be retrieved.

8. The non-transitory computer-readable medium of claim 7, wherein the print job request is a JDF or JMF request.

9. The non-transitory computer-readable medium of claim 7, wherein the location information for the at least one remote file is specified using a URL.

10. The non-transitory computer-readable medium of claim 7, wherein the at least one criteria for deferral includes whether a local storage available to process the at least one remote file is below a specified threshold when the print job is received.

11. The non-transitory computer-readable medium of claim 7, wherein the at least one deferral criteria includes whether an available network bandwidth is below a specified threshold when the print job is received.

12. The non-transitory computer-readable medium of claim 7, wherein the at least one deferral criteria includes whether an estimated time before the at least one remote file can be printed exceeds a specified threshold when the print job is received.

13. A computer-readable memory including program instructions, which when executed by a printer, perform steps in a method for processing print job requests comprising:
receiving, by the printer, a print job request, wherein the print job request includes location information identifying at least one remote file that is a target of the print job request;
parsing, by the printer, the print job request to extract the location information for the at least one remote file;
adding, by the printer, at least one queue entry to a print job queue in the printer comprising a head position, wherein the at least one queue entry corresponds to the print job request, and wherein the printer prints a print job at the head position;
if no criterion for deferral is met,
retrieving, by the printer, the at least one remote file using the location information associated with the remote file,
storing, by the printer, the at least one remote file in a local memory,
associating, by the printer, the at least one queue entry with the at least one remote file stored in the local memory; and
if at least one criteria for deferral is met,
associating, by the printer, the at least one queue entry with the location information for the at least one remote file, deferring, by the printer, attempted retrieval of the remote file until the at least one queue entry is within a predetermined number of positions in the print job queue after the head position, and moving, by the printer, the at least one queue entry to another location in the print job queue if the remote file cannot be retrieved.

14. The computer-readable memory of claim 13, wherein the print job request is a JDF or JMF request.

15. The computer-readable memory of claim 13, wherein the location information for the at least one remote file is specified using a URL.

16. The computer-readable memory of claim 13, wherein the at least one criteria for deferral includes whether a local storage available to process the at least one remote file is below a specified threshold when the print job is received.

17. The computer-readable memory of claim 13, wherein the at least one deferral criteria includes whether an available network bandwidth is below a specified threshold when the print job is received.

18. The computer-readable memory of claim 13, wherein the at least one deferral criteria includes whether an estimated time before the at least one remote file can be printed exceeds a specified threshold when the print job is received.

* * * * *